US012789124B2

(12) United States Patent
Glover et al.

(10) Patent No.: US 12,789,124 B2
(45) Date of Patent: Nov. 10, 2026

(54) PRE-LOADING OF FILTER MEDIA WITH CONTAMINANTS FOR IMPROVED CAPTURE IN PROCESS VESSELS

(71) Applicant: CRYSTAPHASE PRODUCTS, INC., Houston, TX (US)

(72) Inventors: Bradley Glover, Houston, TX (US); Austin Schneider, Humble, TX (US); Jeffrey Scott Oliver, Houston, TX (US); Peter Gregory Ham, Houston, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 454 days.

(21) Appl. No.: 18/375,894

(22) Filed: Oct. 2, 2023

(65) Prior Publication Data

US 2024/0109010 A1 Apr. 4, 2024

Related U.S. Application Data

(60) Provisional application No. 63/412,076, filed on Sep. 30, 2022.

(51) Int. Cl.
*B01D 37/02* (2006.01)

(52) U.S. Cl.
CPC .................................. *B01D 37/025* (2013.01)

(58) Field of Classification Search
CPC .......... B01D 37/025; B01D 2239/0407; B01D 2239/0478; B01D 2239/086;
(Continued)

(56) References Cited

U.S. PATENT DOCUMENTS

| | | | | |
|---|---|---|---|---|
| 3,611,678 A | | 10/1971 | Holden | |
| 3,919,369 A | * | 11/1975 | Holden | B01J 20/28042 264/156 |

(Continued)

FOREIGN PATENT DOCUMENTS

| | | |
|---|---|---|
| WO | 2007/005084 | 1/2007 |
| WO | 2022/110119 | 6/2022 |

(Continued)

OTHER PUBLICATIONS

European Patent Office; PCT International Search Report, issued in connection to PCT/US2023/034312; Jan. 19, 2024; 4 pages; Europe.

(Continued)

*Primary Examiner* — Dung H Bui
(74) *Attorney, Agent, or Firm* — Greenberg Traurig LLP

(57) ABSTRACT

A method of filtration in a process vessel using a treated filter media which has been treated with a conditioner for improved filtration of contaminants is provided. The treated filter media can be used in process vessels for refining, petrochemical, and chemical plants to treat process streams. The conditioner can be the same material as what is expected to be captured during the fouling process. In other words, the conditioner that is added to the treated filter media can be the same material as the contaminant in the fluid stream to be treated. This allows for chemical compatibility with an existing process fluid stream. This also allows for the natural continuation of the filtration process.

42 Claims, 7 Drawing Sheets

(58) Field of Classification Search

CPC ............ B01D 2239/1208; B01D 39/04; B01D 39/06; B01D 39/083; B01D 39/086; B01D 39/1638; B01D 39/1669; B01D 39/2031; B01D 39/2072; B01D 37/02; B01J 20/20

See application file for complete search history.

(56) References Cited

U.S. PATENT DOCUMENTS

| | | | | |
|---|---|---|---|---|
| 4,830,643 | A * | 5/1989 | Sassa | B01D 53/261<br>55/528 |
| 6,296,691 | B1 | 10/2001 | Gidumal | |
| 7,323,024 | B2 | 1/2008 | Morrell et al. | |
| 8,685,252 | B2 | 4/2014 | Vuong et al. | |
| 10,905,991 | B2 | 2/2021 | Lu et al. | |
| 11,052,351 | B1 | 7/2021 | Griswold et al. | |
| 11,052,363 | B1 * | 7/2021 | Glover | B01J 19/30 |
| 2005/0255014 | A1 * | 11/2005 | Glover | B01J 8/0469<br>422/504 |
| 2007/0187314 | A1 | 8/2007 | Sambrook | |
| 2009/0031855 | A1 * | 2/2009 | Ramberg | B01D 46/58<br>423/210 |
| 2010/0047142 | A1 * | 2/2010 | Wood | B01J 20/3204<br>502/200 |
| 2010/0176044 | A1 | 7/2010 | Domb et al. | |
| 2011/0036778 | A1 | 2/2011 | Willuweit | |
| 2013/0056428 | A1 | 3/2013 | Levy | |
| 2016/0360745 | A1 | 12/2016 | Johnston et al. | |
| 2017/0292060 | A1 * | 10/2017 | Vittur | A01N 25/08 |
| 2018/0236385 | A1 * | 8/2018 | Jinka | B01D 39/083 |
| 2019/0070541 | A1 * | 3/2019 | Kuenzel | B01D 39/16 |
| 2019/0161688 | A1 * | 5/2019 | Mao | B01J 20/20 |
| 2020/0054975 | A1 * | 2/2020 | Belmont | D21H 11/18 |
| 2021/0307330 | A1 * | 10/2021 | Grage, Jr. | C02F 1/76 |
| 2021/0370208 | A1 * | 12/2021 | Yegya-Raman | B01D 39/083 |
| 2023/0002245 | A1 | 1/2023 | Kamali et al. | |
| 2023/0051258 | A1 * | 2/2023 | Jaganathan | B01D 39/18 |
| 2023/0241578 | A1 * | 8/2023 | Narayanan | C02F 1/288<br>502/402 |

FOREIGN PATENT DOCUMENTS

| | | |
|---|---|---|
| WO | 2022/251175 | 12/2022 |
| WO | 2024/073139 | 4/2024 |

OTHER PUBLICATIONS

European Patent Office; PCT Written Opinion of the International Searching Authority, issued in connection to PCT/US2023/034312; Jan. 19, 2024; 5 pages; Europe.

The International Bureau of WIPO; PCT International Preliminary Report on Patentability, issued in connection with patent application No. PCT/US2023/034312; 7 pages; Apr. 10, 2025; Switzerland.

* cited by examiner

Unconditioned Filter Media

Treated Filter Media

PRE-LOADING OF FILTER MEDIA WITH CONTAMINANTS FOR IMPROVED CAPTURE IN PROCESS VESSELS

RELATED APPLICATIONS

This application claims the benefit, and priority benefit, of U.S. Provisional Patent Application Ser. No. 63/412,076, filed Sep. 30, 2022, the disclosure and contents of which are incorporated by reference herein in their entirety.

BACKGROUND

1. Field of the Invention

The presently disclosed subject matter relates generally to process vessels, and more specifically, to decontamination of one or more fluid streams contained in process vessels and to the materials and methods for filtration of contaminants contained in fluid streams in industrial process facilities.

2. Description of the Related Art

Various types of process vessels are used in refining, petrochemical, and chemical plants to treat process streams. These can include, without limitation. reactors, separators, guard vessels, sorbent beds, and fixed-bed feed filters. A large variety of treating processes occur in these different types of vessels.

Fluid streams entering and/or passing through these vessels can contain undesired particles which are detrimental to treating processes. The undesired particles are known as contaminants. These process vessels often use filter media to filter contaminants contained in the feeds from entering the one or more beds of processing materials contained in the vessel.

Typical filter media used in process vessels are known to have a reduced trapping efficiency at start-of-run, which can result in underutilization of the filter media as well as early contaminant deposition in downstream layers.

Improvements in this field of technology are therefore desired.

SUMMARY

In accordance with the presently disclosed subject matter, various illustrative embodiments of a filter media that has been treated with a conditioner for improved filtration of contaminants in process vessels are described herein.

In certain illustrative embodiments, a method of filtration in a process vessel is provided. A filtration zone is provided in the process vessel, wherein the filtration zone comprises a plurality of treated filter media. A fluid stream is passed through the filtration zone, and one or more contaminants are removed from the fluid stream with the treated filter media. Each of the treated filter media can have an internal void space formed therein, and a conditioner can be embedded within the internal void space prior to installing the treated filter media into the vessel such that the internal void space is filled with the conditioner in the range from 1%-90% by volume. The conditioner can comprise one or more of iron sulfide, coke, bio-char, charcoal, carbon black, and phosphate salts. The contaminants can comprise one or more of iron sulfide, coke, bio-char, charcoal, carbon black, and phosphate salts. The conditioner can consist of one or more of iron sulfide, coke, bio-char, charcoal, carbon black, and phosphate salts. The contaminants can consist of one or more of iron sulfide, coke, bio-char, charcoal, carbon black, and phosphate salts. The internal void space can be filled with the conditioner in the range of 5%-80% by volume. The internal void space can be filled with the conditioner in the range of 5%-30% by volume. The internal void space can be filled with the conditioner in the range of 40%-60% by volume. The internal void space can be filled with the conditioner in the range of 50%-90% by volume. The process vessel can be, for example, a reactor, a guard vessel, a sorbent bed, or a feed filter. The conditioner can comprise pre-existing particles previously entrained in a filter media prior to use. The conditioner can comprise particles added to a filter media prior to use that then become entrained prior to loading in the process vessel.

In certain illustrative embodiments, a method of filtration in a process vessel is provided. A filtration zone is provided in the process vessel, wherein the filtration zone contains a plurality of treated filter media. A fluid stream is passed through the filtration zone, and one or more contaminants are removed from the fluid stream with the treated filter media. Each of the treated filter media can have an internal void space formed therein, and a conditioner can be embedded within the internal void space prior to installing the treated filter media into the process vessel such that the internal void space has 10%-99% by volume of the original void space remaining. The conditioner can comprise one or more of iron sulfide, coke, bio-char, charcoal, carbon black, and phosphate salts. The contaminants can comprise one or more particles of iron sulfide, coke, bio-char, charcoal, carbon black, and phosphate salts. The conditioner can consist of one or more of iron sulfide, coke, bio-char, charcoal, carbon black, and phosphate salts. The contaminants can consist of one or more particles of iron sulfide, coke, bio-char, charcoal, carbon black, and phosphate salts. The internal void space can have 20%-95% by volume of the original void space remaining. The internal void space can have 70%-95% by volume of the original void space remaining. The internal void space can have 40%-60% by volume of the original void space remaining. The internal void space can have 10%-50% by volume of the original void space remaining. The process vessel can be, for example, a reactor, a guard vessel, a sorbent bed, or a feed filter. The conditioner can comprise pre-existing particles previously entrained in a filter media prior to use. The conditioner can comprise particles added to a filter media prior to use that then become entrained prior to loading in the process vessel.

In certain illustrative embodiments, a method of filtration in a process vessel is provided. A filtration zone is provided in the process vessel, wherein the filtration zone comprises a plurality of treated filter media. A fluid stream is passed through the filtration zone, and one or more contaminants are removed from the fluid stream with the treated filter media. Each of the treated filter media can have an internal void space formed therein, and a conditioner can be embedded within the internal void space prior to installing the treated filter media into the vessel such that the internal void space is filled with the conditioner in the range from 1%-90% by volume. The conditioner can comprise the same material as the contaminants.

In certain illustrative embodiments, a method of filtration in a process vessel is provided. A filtration zone is provided in the process vessel, wherein the filtration zone contains a plurality of treated filter media. A fluid stream is passed through the filtration zone, and one or more contaminants are removed from the fluid stream with the treated filter media. Each of the treated filter media can have an internal void space formed therein, and a conditioner can be embedded within the internal void space prior to installing the treated filter media into the process vessel such that the internal void space has 10%-99% by volume of the original void space remaining. The conditioner can comprise the same material as the contaminants.

In certain illustrative embodiments, a process vessel is provided. The process vessel can have a filtration zone located therein, wherein the filtration zone comprises a plurality of treated filter media. The process vessel is configured such that a fluid stream can be passed through the filtration zone, and one or more contaminants can be removed from the fluid stream with the treated filter media. Each of the treated filter media can have an internal void space formed therein, and a conditioner can be embedded within the internal void space prior to installing the treated filter media into the vessel such that the internal void space is filled with the conditioner when the treated filter media is first installed in the vessel in the range from 1%-90% by volume. The internal void space can be filled with the conditioner in the range of 5%-80% by volume. The internal void space can be filled with the conditioner in the range of 5%-30% by volume. The internal void space can be filled with the conditioner in the range of 40%-60% by volume. The internal void space can be filled with the conditioner in the range of 50%-90% by volume. The process vessel can be, for example, a reactor, a guard vessel, a sorbent bed, or a feed filter. The conditioner can comprise pre-existing particles previously entrained in a filter media prior to use. The conditioner can comprise particles added to a filter media prior to use that then become entrained prior to loading in the process vessel. Alternatively, the internal void space can have 10%-99% by volume of the original void space remaining. The internal void space can have 20%-95% by volume of the original void space remaining. The internal void space can have 70%-95% by volume of the original void space remaining. The internal void space can have 40%-60% by volume of the original void space remaining. The internal void space can have 10%-50% by volume of the original void space remaining. The conditioner can comprise one or more of iron sulfide, coke, bio-char, charcoal, carbon black, and phosphate salts. The contaminants can comprise one or more of iron sulfide, coke, bio-char, charcoal, carbon black, and phosphate salts. The conditioner can consist of one or more of iron sulfide, coke, bio-char, charcoal, carbon black, and phosphate salts. The contaminants can consist of one or more of iron sulfide, coke, bio-char, charcoal, carbon black, and phosphate salts. The conditioner can comprise the same material as the contaminants.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

Figure 1:
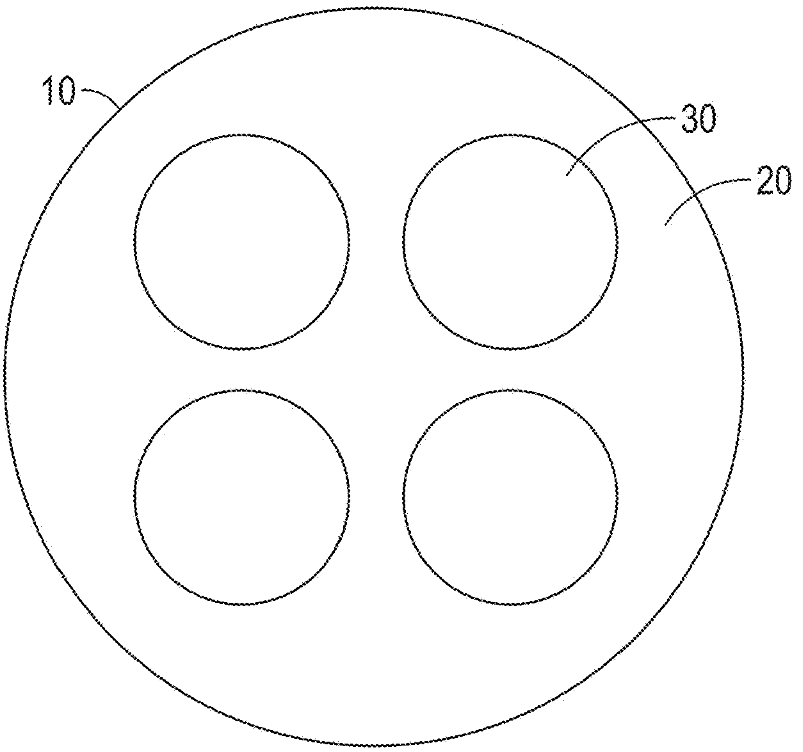
FIG. 1 (Prior Art)
FIG. 1 is a side view of an unconditioned filter media with greater than 20% internal void space where the non-void structure makes up the balance.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

In accordance with the presently disclosed subject matter, various illustrative embodiments of a filter media that has been treated with a conditioner 50 for improved filtration of contaminants 45 in process vessels 60 are described herein.

Contaminants 45 can comprise or consist of one or more of iron sulfide, coke, bio-char, charcoal, carbon black, or phosphate salts.

In certain illustrative embodiments, the treated filter media 40 can be used in process vessels 60 for refining, petrochemical, and chemical plants to treat process streams. These vessels can include, without limitation, reactors, separators, guard vessels, sorbent beds, and fixed-bed feed filters. A reactor is a type of trickle bed process vessel 60.

Filtration is a means for separating a solid contaminant 45 from a fluid stream in a process vessel 60, where the solid contaminant 45 is deposited on or within a filtration media. This is different than adsorption which refers to the removal of atoms, molecules, and ions dissolved in a fluid stream.

Process vessels 60 can also contain processing materials. Typical processing materials can include one or more beds of catalysts or molecular sieves. The contaminants 45 recovered during filtration are referred to herein as retentate. The decontaminated feed streams from which contaminants 45 have been at least partially removed are referred to herein as filtrate. Removal of contaminants 45 can protect processing material and lengthen the on-oil cycle time of the vessel. As contaminants 45 are removed, they collect on the filtering media as retentate.

When loaded into process vessels 60, traditional filter media are clean and devoid of retentate. These filter media can be described as unconditioned, meaning fresh, clean or less than 1% full of contaminants 45. Typical unconditioned filter media 10 can include porous structures such as reticulates, extrudates, wagon wheels, monoliths, rings, etc. Unconditioned filter media 10 can trap contaminants 45, and the contaminants 45 then become retentate within the void spaces of filter media 10 until the trapping capacity has been exhausted and the filter media can be replaced. Typically, unconditioned filter media 10 contain an internal void space 30 greater than 20% of the filter media, and the internal void space 30 is capable of trapping contaminants 45 from the feed. Unconditioned filter media 10 are known to have a reduced trapping efficiency at start-of-run, which can result in underutilization of the filter media as well as early contaminant 45 deposition in downstream layers.

In certain illustrative embodiments, unconditioned filter media 10 can be treated with conditioner 50 resulting in a treated filter media 40. In certain illustrative embodiments, the conditioner 50 can be a simulant. In other illustrative embodiments, the conditioner 50 can be a retentate. The conditioner 50 can include, or consist of, one or more of iron sulfide, coke, bio-char, charcoal, carbon black, or phosphate salts, and can be applied to the filter media 10 before loading the treated filter media 40 into a vessel 60 or before start of operations.

Retentate is defined as a conditioner 50 that comprises pre-existing particles previously entrained in a filter media prior to use. For example, a filter media unloaded from a process vessel 60 can contain retentate within the internal void of the filter media. The filter media unloaded from a process vessel 60, can be reused in another process vessel 60. Simulant is defined as a conditioner 50 that comprises particles added to a filter media prior to use that then become entrained prior to loading in a process vessel 60. A filter media previously treated with retentate, can also be further treated with conditioner 50.

Referring now to the drawings, FIG. 1 is a representative example of an unconditioned filter media 10 with greater than 20% internal void space 30. The filter media 10 has a solid non-void structural piece 20. The internal void space 30 of the unconditioned filtration media 10 has 0% conditioner 50.

Figure 3:
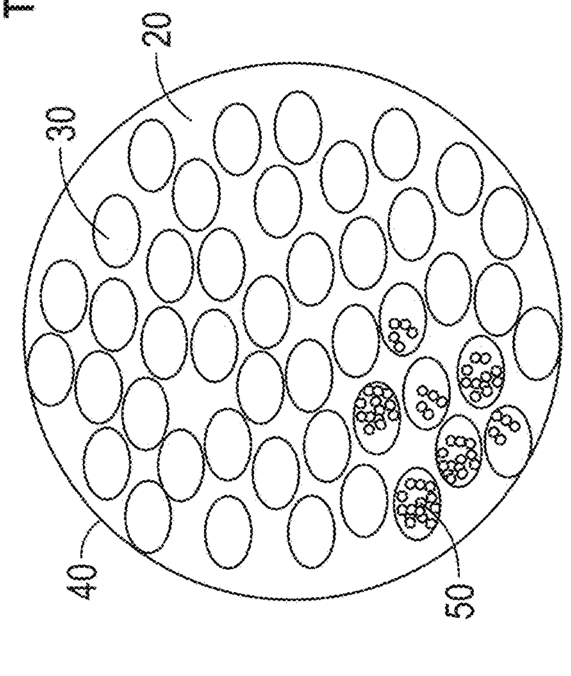
FIG. 3 is a side view of a piece of treated filter media that has been treated with conditioner to fill approximately 5% of the internal void space, according to embodiments of the presently disclosed subject matter.
Figure 4:
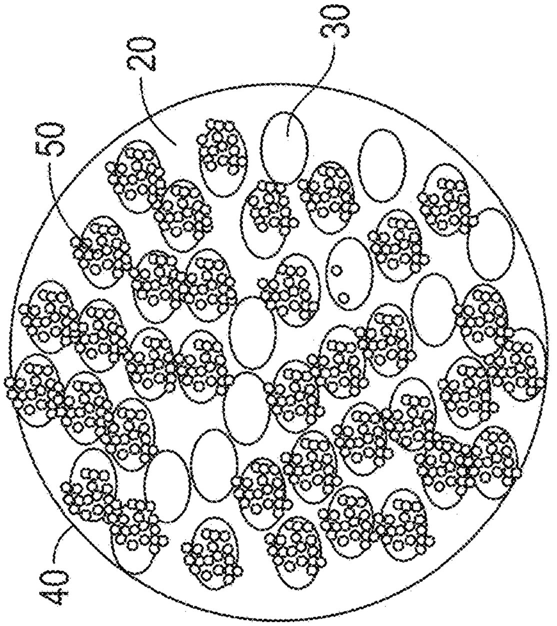
FIG. 4 is a side view of a treated filter media that has been treated with conditioner to fill approximately 80% of the internal void space, according to embodiments of the presently disclosed subject matter.

By comparison, in the illustrative embodiment of FIG. 3, a piece of treated filter media 40 is treated with conditioner 50 to fill approximately 5% of the internal void space 30. In the illustrative embodiment of FIG. 4, the treated filter media 40 is treated with conditioner 50 to fill approximately 80% of the internal void space 30. In certain illustrative embodiments, the internal void space 30 can be treated with conditioner 50 to fill approximately 1%, 5%, 10%, 15%, 20%, 25%, 30%, 35%, 40%, 45%, 50%, 55%, 60%, 65%, 70%, 75%, 80%, 85%, or 90% of the internal void space 30. Embodiments with the internal void space 30 filled from 1%-50% are beneficial due to potential for greater capacity for filtration of contaminants 45. Embodiments with the internal void space 30 filled from 1%-20% are beneficial due to minimized restrictions on filtration capacity while providing a minimum effective conditioner 50 to attain increased filtration efficiency. Embodiments with the internal void space 30 filled from 50%-90% are beneficial due to the potential for greater efficiency of filtration of contaminants 45. Embodiments with the internal void space 30 from filled 70%-90% are beneficial due to increased attainable filtration efficiency while having useful filtration capacity.

Figure 2:
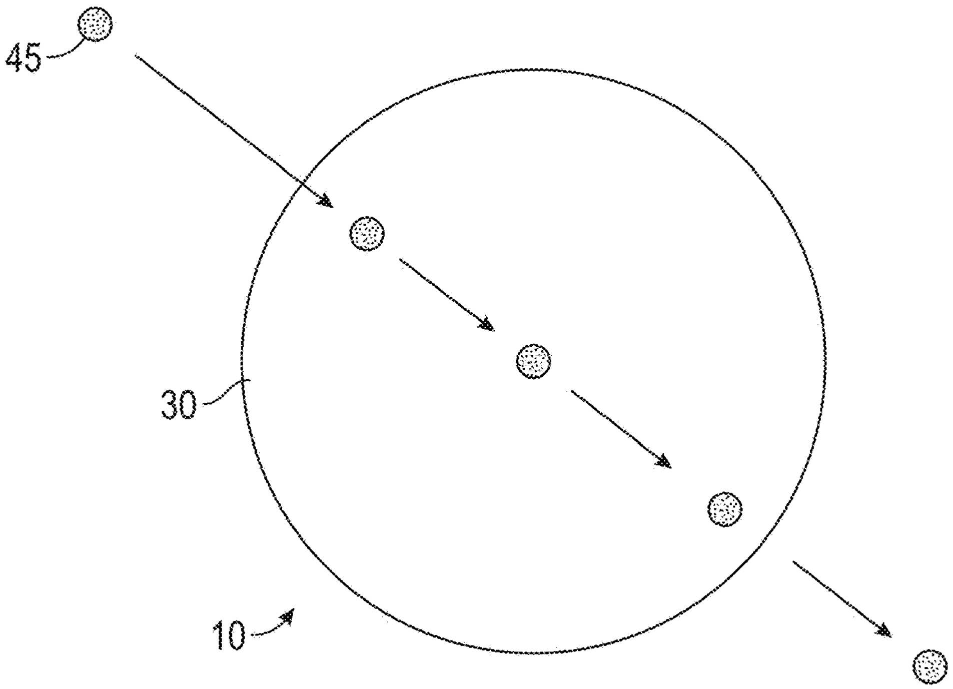
FIG. 2 is a side view of a piece of contaminant passing through an internal void space of an unconditioned filter media, and not being captured.
Figure 5:
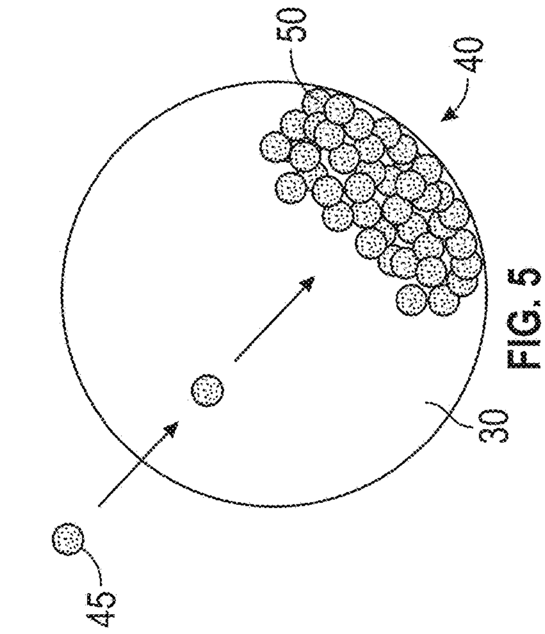
FIG. 5 is a side view of a piece of contaminant passing into an internal void space of a piece of treated filter media with approximately 20% of the internal void space pre-filled with conditioner, according to embodiments of the presently disclosed subject matter.
Figure 6:
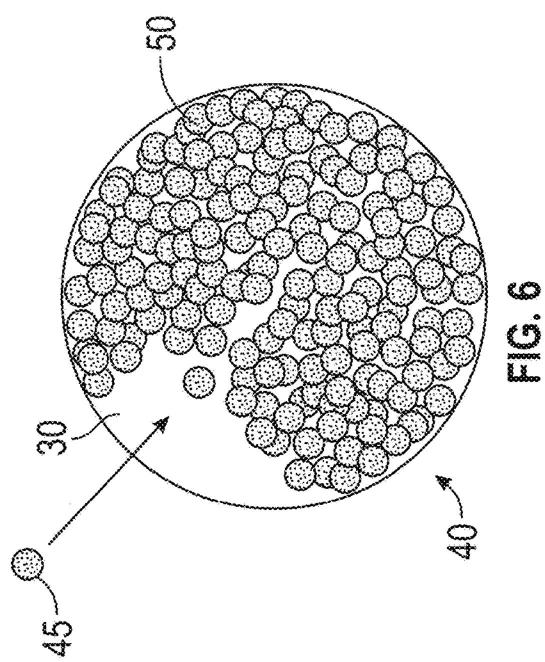
FIG. 6 is a side view of a piece of contaminant passing into an internal void space of a piece of treated filter media with approximately 80% of the internal void space pre-filled with conditioner, according to embodiments of the presently disclosed subject matter.

FIG. 2 is a representative example of a piece of contaminant 45 passing through an internal void space 30 of an unconditioned filter media 10, and not being captured. By comparison, in the illustrative embodiment of FIG. 5, a piece of contaminant 45 is shown passing into an internal void space 30 of a piece of treated filter media 40 with approximately 20% of the internal void space 30 pre-filled with conditioner 50. In the illustrative embodiment of FIG. 6, a piece of contaminant 45 is shown passing into an internal void space 30 of a piece of treated filter media 40 with approximately 80% of the internal void space 30 pre-filled with conditioner 50.

Figure 7:
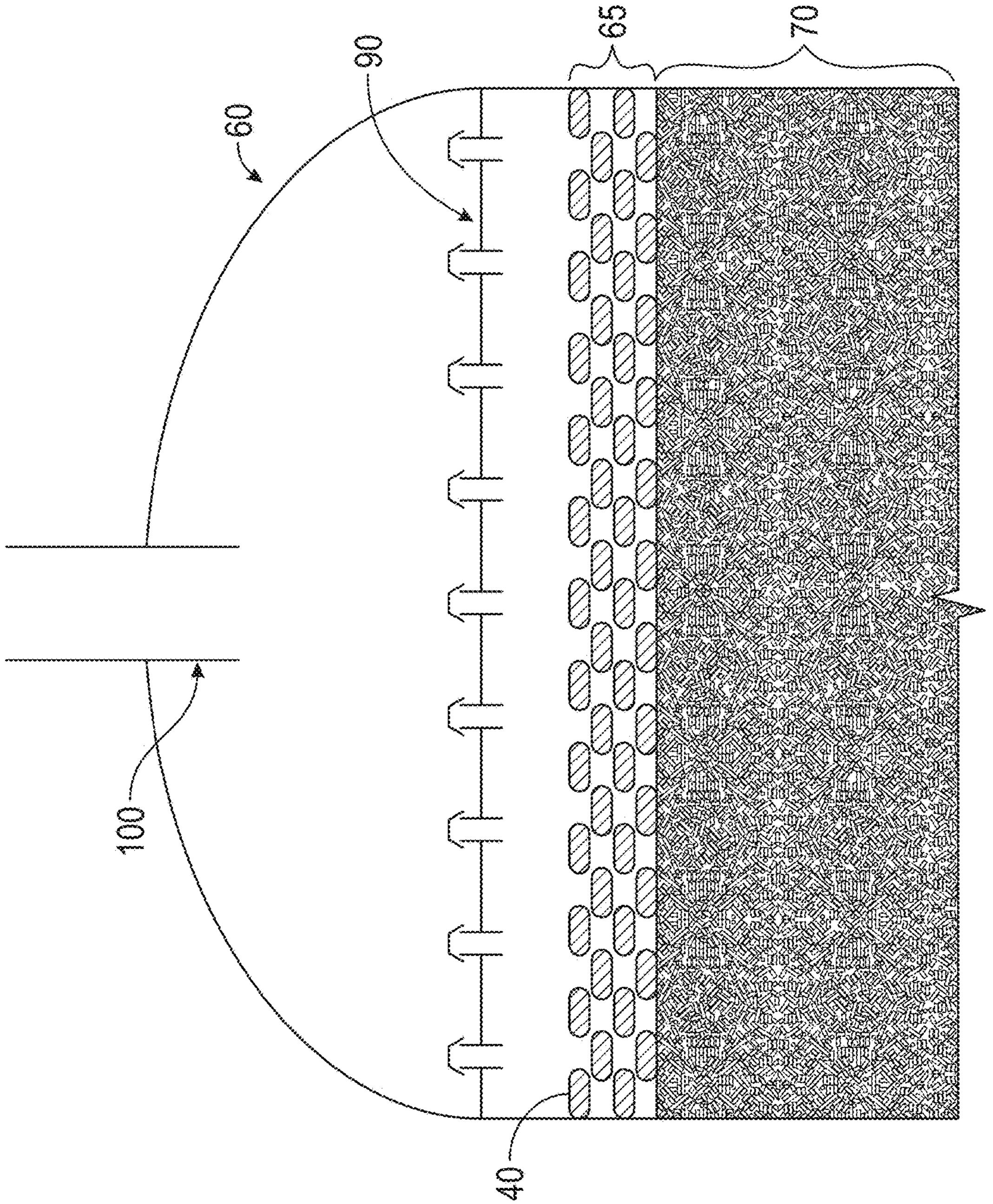
FIG. 7 is a side view of the top portion of a process vessel with an inlet pipe and distributor tray loaded with a filtration zone that contains treated filter media on top of a bed of processing elements according to embodiments of the presently disclosed subject matter.
Figure 8:
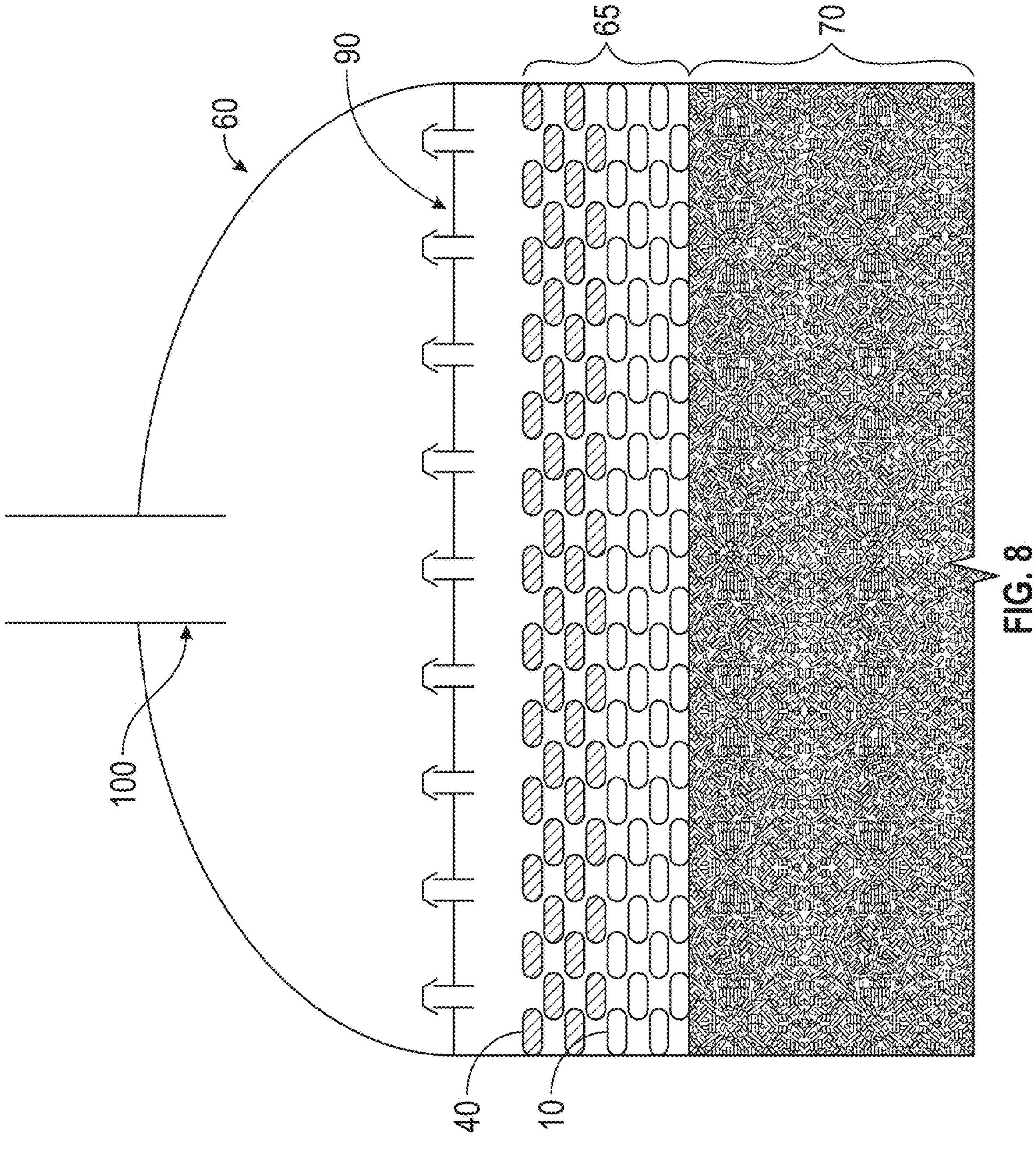
FIG. 8 is a side view of the top portion of a process vessel with an inlet pipe and distributor tray loaded with a filtration zone that contains treated filter media on top of unconditioned filter media which are on top of a bed of processing elements according to embodiments of the presently disclosed subject matter.
Figure 9:
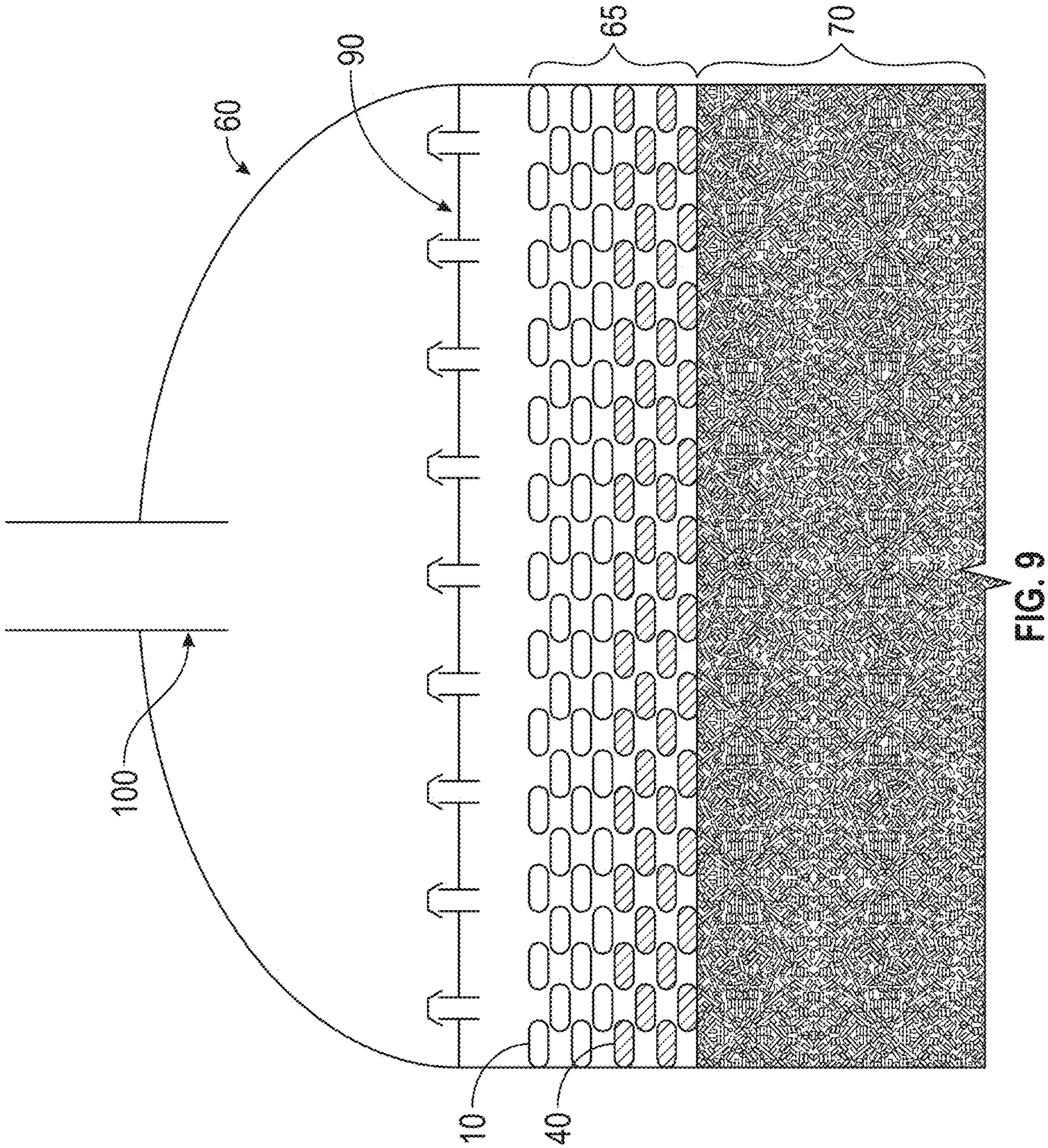
FIG. 9 is a side view of the top portion of a process vessel with an inlet pipe and distributor tray loaded with a filtration zone that contains unconditioned filter media on top of treated filter media which are on top of a bed of processing elements according to embodiments of the presently disclosed subject matter.

In the illustrative embodiment of FIG. 7, the top portion of a process vessel 60 is loaded with treated filter media 40 on top of a bed of processing elements 70. In addition, the process vessel 60 has an inlet pipe 100 and distributor tray 90. In the illustrative embodiment of FIG. 8, the top portion of a process vessel 60 loaded with treated filter media 40 on top of unconditioned filter media 10 which are on top of a bed of processing elements 70. In addition, the process vessel 60 has an inlet pipe 100 and distributor tray 90. In the illustrative embodiment of FIG. 9, the top portion of a process vessel 60 loaded with unconditioned filter media 10 on top of treated filter media 40 which are on top of a bed of processing elements 70. In addition, the process vessel 60 has an inlet pipe 100 and distributor tray 90.

Figure 11:
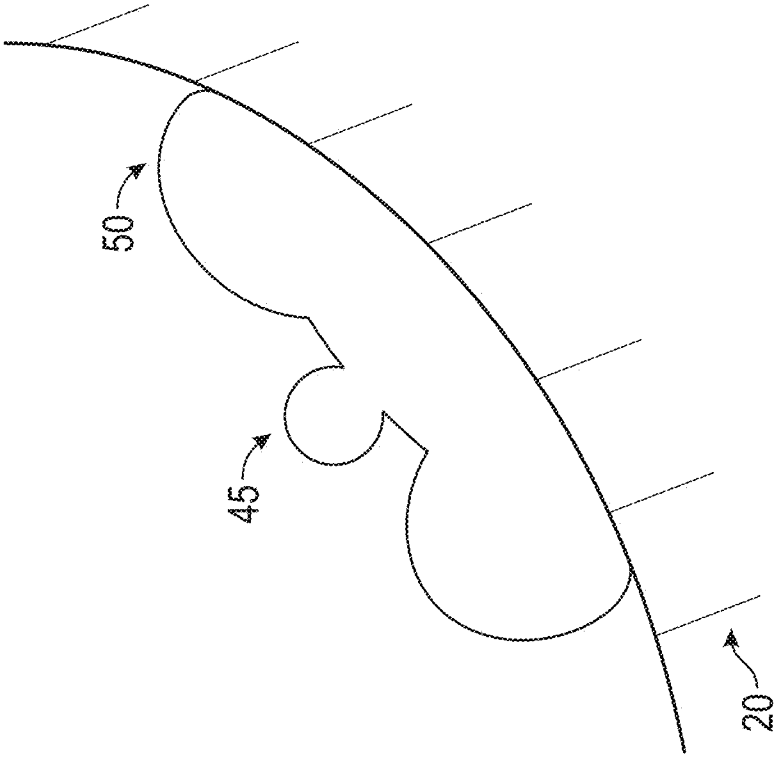
FIG. 11 is a side view of a polymerization compound which has been captured as a retentate by polymerization with a conditioner that is a polymerization compound according to embodiments of the presently disclosed subject matter.
Figure 10:
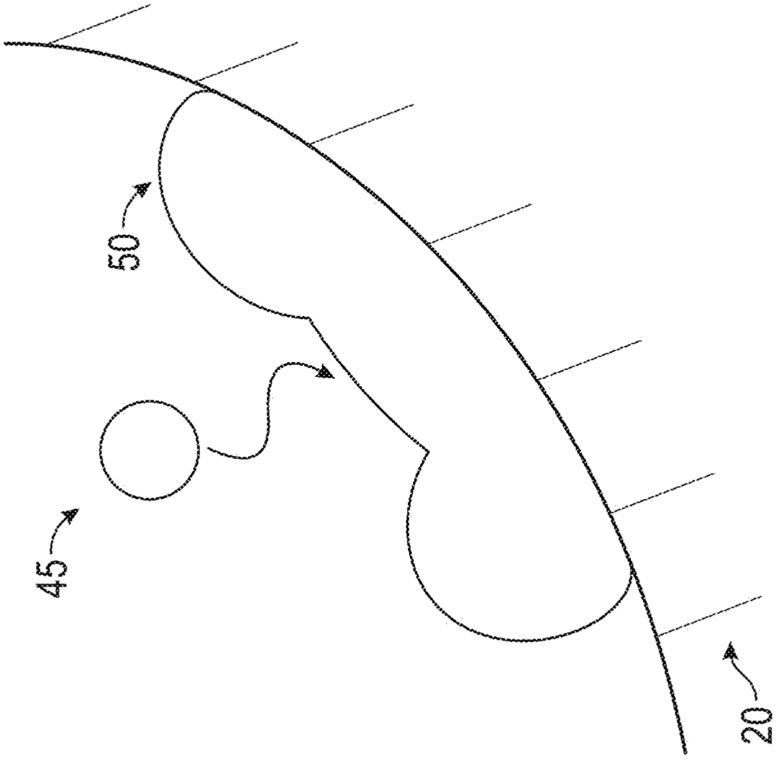
FIG. 10 is a side view of a polymerization compound used as a conditioner in order to enable capture of other polymerization compounds which are contaminants according to embodiments of the presently disclosed subject matter.

In the illustrative embodiment of FIG. 10, a polymerization compound is used as a conditioner 50 in order to enable capture of other polymerization compounds which are contaminants 45. FIG. 11 is a depiction of the polymerization compound which has been captured via polymerization with the conditioner 50 that is a polymerization compound.

Figure 13:
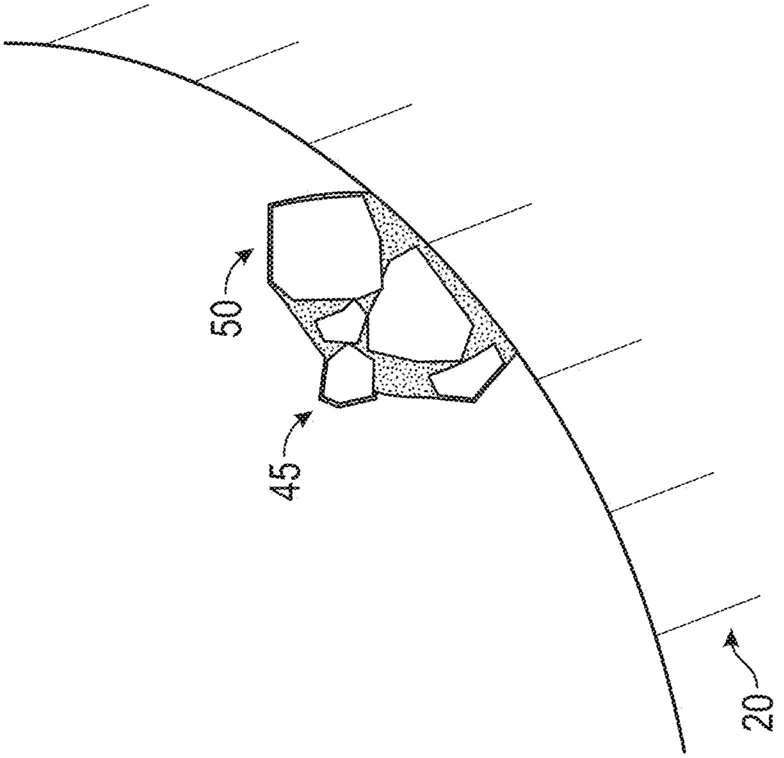
FIG. 13 is a side view of a contaminant which has been captured as a retentate by agglomeration with a conditioner that is an agglomerate according to embodiments of the presently disclosed subject matter.
Figure 12:
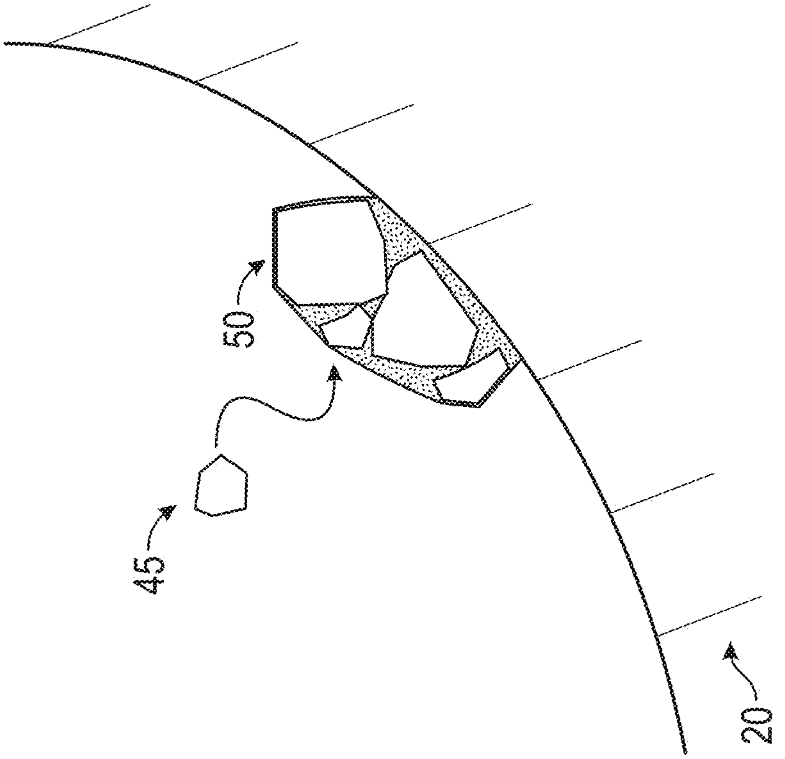
FIG. 12 is a side view of an agglomerate used as a conditioner to enable capture of contaminants via the process of agglomeration according to embodiments of the presently disclosed subject matter.

In the illustrative embodiment of FIG. 12, an agglomerate is used as a conditioner 50 to enable capture of contaminants 45 via the process of agglomeration. FIG. 13 is a depiction of a contaminant 45 which has been captured via agglomeration with a conditioner 50 that is an agglomerate.

In certain illustrative embodiments, Brunauer-Emmett-Teller (or "BET") surface area of the conditioner 50 can be $<5\ m^2/g$, $<10\ m^2/g$ or $<300\ m^2/g$. In certain illustrative embodiments, the size of the pores within the filter media is in the range of 100 to 6000 μm. In other illustrative embodiments, the size of the pores within the filter media is in the range of 500 to 700 μm, 600 to 800 μm, 700 to 900 μm, 900 to 1100 μm, 1500 to 3000 μm, or 4000 to 6000 μm. In certain illustrative embodiments, the particle size d10 of the conditioner 50 is in the range of 10 to 500 μm. In other illustrative embodiments, the particle size d10 is in the range of 10 to 100 μm. In other illustrative embodiments, the particle size d10 is in the range of 10 to 20 μm. In other illustrative embodiments, the particle size d10 is in the range of 100 to 500 μm. In certain illustrative embodiments, the particle size d90 of the conditioner 50 is in the range of 50 to 3000 μm. In other illustrative embodiments, the particle size d90 of the conditioner 50 is in the range of 100 to 3000 μm. In other illustrative embodiments, the particle size d90 of the conditioner 50 is in the range of 600 to 3000 μm. In other illustrative embodiments, the particle size d90 of the conditioner 50 is in the range of 50 to 600 μm. As used herein, "d" means particle size distribution where, e.g., the length unit d10 represents that 10% of particles are smaller than this size, and d90 represents that 90% of particles are smaller than this size.

In certain illustrative embodiments, the process of treating an unconditioned filter media 10 with conditioner 50 can include filling the internal void 30 of the unconditioned filter media 10 by adding a conditioner 50 to the internal surface of the filter media 10 to form a treated filter media 40 which can improve the filtration efficiency of the filter media. Pores within the unconditioned filter media 10 have a certain volume. Unconditioned filter media 10 have an internal void, made up of pores, that is 100% available for particle storage. As conditioner 50 is added to the unconditioned filter media 10, it takes up volume within the internal void, filling the pores and reducing the internal void volume available for particle storage to less than 100%. A treated filter media 40 contains greater than 1% of conditioner 50 in its internal void space 30 prior to use.

In certain illustrative embodiments, the conditioner 50 can be the same material as what is expected to be captured during the fouling process. In other words, the conditioner 50 that is added to the filter media 10 can be the same material as the contaminant 45 in the fluid stream to be treated in the process vessel 60. For example, if contaminants 45 comprise of one or more particles of iron sulfide, coke, bio-char, charcoal, carbon black, and phosphate salts, then the conditioner 50 can also comprise or consist of one or more particles of iron sulfide, coke, bio-char, charcoal, carbon black, and phosphate salts. This allows for chemical compatibility with an existing process fluid stream. This also allows for the natural continuation of the filtration process. Process vessels 60 may be shut down for all kinds of reasons. By having the same material as the contaminant 45 treated onto the filter media 10, the process operation can continue as it was when the process vessel 60 was shutdown to avoid releases of contaminants 45 which may be detrimental to process vessel 60 operation.

In certain illustrative embodiments, contaminants 45 can polymerize or agglomerate upon or during deposition. Providing a structure for that polymerization or agglomeration to occur is beneficial for the filtration process as this can increase the efficiency of contaminant 45 capture and retention. Polymerization compounds tend to self-perpetuate. Capturing polymers on the surface of a filter media enables further efficient capture of those contaminants 45. Additionally, agglomeration is the process by which smaller contaminants combine to form larger contaminants.

In certain illustrative embodiments, the inclusion of conditioner 50 in the filter medium enables smaller contaminants 45 to attach to larger bodies of like contaminants already formed on a substrate, the benefit of which is improved efficiency of contaminant 45 removal in the cases of polymerization and agglomeration. Efficient contaminant 45 removal within the treated filter media 40 mitigates contaminant deposition in a downstream processing operation which can cause premature shut down of the process vessel 60.

In certain illustrative embodiments, the filter media can be high geometric surface area media, including porous media. Porous media are defined as a solid with pores which enter into and/or through the media. The porous media can include reticulates, honeycomb monoliths, macro-porous materials, fissured material, agglomerates of particle packing, and fibrous mesh. These porous media can be shaped as spheres, cylinders, rings, briquettes, ellipsoids, prisms, cubes, parallelepipeds, orthotopes, saddles, wagon wheels, medallions, lobed extrudates and the like. Porous media can be metallic, ceramic, polymeric or combinations of these. Porous media can be oxides, nitrides, carbides or the like. In certain illustrative embodiments, filter media can be inert. Porous media typically have an internal void space 30 in the range of 10% to 99% of the porous body. A preferred embodiment of the internal void space 30 would 50%-85% of the porous body. Porous media typically has a size range from 1/32 inch to 36 inches in the minimum major dimension. A preferred embodiment of the size range is from 1/8 inch to 3 inches in the minimum major dimension. Another embodiment can also be one piece of filter media that stretches up to the entire area of the vessel.

In certain illustrative embodiments, a method of filtration in a process vessel 60 is provided that includes: providing a filtration zone 65 in the process vessel 60, wherein the filtration zone 65 contains a plurality of treated filter media 40; passing a fluid stream through the filtration zone 65; and removing one or more contaminants 45 from the fluid stream with the treated filter media 40, wherein each of the treated filter media 40 has an internal void space 30 formed therein, and wherein a conditioner 50 is embedded within the internal void space 30 prior to installing the treated filter media 40 into the vessel such that the internal void space 30 is filled with the conditioner 50 in the range from 1%-90% by volume. In another illustrative embodiment, the internal void space 30 is filled with the conditioner 50 in the range of 5%-80% by volume. In another illustrative embodiment, the internal void space 30 is filled with the conditioner 50 in the range of 5%-30% by volume. In another illustrative embodiment, the internal void space 30 is filled with the conditioner 50 in the range of 30%-60% by volume. In another illustrative embodiment, the internal void space 30 is filled with the conditioner 50 in the range of 40%-60% by volume. In another illustrative embodiment, the internal void space 30 is filled with the conditioner 50 in the range of 20%-90% by volume.

The simulant can be applied to the filter media by various treating methods such as wash coating, dusting, or filter media that has been unloaded and is being reused. Wash coating is defined as the process of suspending the simulant in a liquid and passing that suspension over the filter media. This enables solids deposition of the suspended simulant to treat the filter media. Dusting is defined as a process of entraining the simulant in a gas flow and passing that mixture over the filter media. This enables solids deposition of the entrained simulant to treat the filter media. The wash coating or dusting process can also be used with a binding agent. Reuse is defined as applying treated filter media 40 to a second, independent operational process that has become treated during an initial operational process. In reuse, the retentate within the original void space of the filter media from one operational process becomes the conditioner 50 of the treated filter media 40 where the treated filter media 40 is subsequently used in another operational process.

In certain illustrative embodiments, a filter media that is treated with simulant, where the simulant occupies a range from 1-80% of the original void space within the media, would improve filtration efficiency of that treated filter media 40. The indicated range from 1-90% of the original void space that is treated refers to the void space in the unconditioned filtering media, where greater than 1% and less than 90% of the original void is already pre-filled. A preferred range of simulant treating would be where in the range from 5%-80% of the original void space within the media is already pre-filled prior to loading. Another preferred range of simulant treating would be where in the range from 5%-30% of the original void space within the media is already pre-filled prior to loading. Another preferred range of simulant treating would be where in the range from 30%-60% of the original void space within the media is already pre-filled prior to loading. Another preferred range of simulant treating would be where in the range from 40%-60% of the original void space within the media is already pre-filled prior to loading. Another preferred range of simulant treating would be where greater than 20% of the original void space within the media is already pre-filled prior to loading. Another preferred range of simulant treating would be where in the range from 5%-30% of the original void space within the media is already pre-filled prior to loading. Another preferred range of simulant treating would be where in the range from 5%-80% of the original void space within the media is already pre-filled prior to loading.

In certain illustrative embodiments, unconditioned filter media 10 or fresh filter media or new filter media may be used as long as it is treated with simulant in the range from 1%-90% of the original void space within the media prior to loading. A preferred range of simulant treating would be where in the range from 5%-80% of the original void space within the media is already pre-filled prior to loading. Another preferred range of simulant treating would be where in the range from 5%-30% of the original void space within the media is already pre-filled prior to loading. Another preferred range of simulant treating would be where in the range from 30%-60% of the original void space within the media is already pre-filled prior to loading. Another preferred range of simulant treating would be where in the range from 40%-60% of the original void space within the media is already pre-filled prior to loading. Another preferred range of simulant treating would be where greater than 20% of the original void space within the media is already pre-filled prior to loading.

In certain illustrative embodiments, clean filter media or previously used material where less than 1% of the original void space within the media is filled may be used as long as it is treated with simulant in the range of 5%-90% of the void space within the media prior to loading. A preferred range of simulant treating would be where in the range from 5%-80% of the original void space within the media is already pre-filled prior to loading. Another preferred range of simulant treating would be where in the range from 5%-30% of the original void space within the media is already pre-filled prior to loading. Another preferred range of simulant treating would be where in the range from 30%-60% of the original void space within the media is already pre-filled prior to loading. Another preferred range of simulant treating would be where in the range from 40%-60% of the original void space within the media is already pre-filled prior to loading. Another preferred range of simulant treating would be where greater than 20% of the original void space within the media is already pre-filled prior to loading.

In certain illustrative embodiments, previously used or recycled filter media may be utilized, as long as the retentate volume is in the range from 1%-90% of the original void space within the media prior to loading. A preferred range of retentate treating would be where in the range from 5%-80% of the original void space within the media is already pre-filled prior to loading. Another preferred range of retentate treating would be where in the range from 5%-30% of the original void space within the media is already pre-filled prior to loading. Another preferred range of retentate treating would be where in the range from 30%-60% of the original void space within the media is already pre-filled prior to loading. Another preferred range of retentate treating would be where in the range from 40%-60% of the original void space within the media is already pre-filled prior to loading. Another preferred range of retentate treating would be where greater than 20% of the original void space within the media is already pre-filled prior to loading. Furthermore, a simulant could be added to used or recycled filter media to enhance efficiency of contaminant 45 removal.

In certain illustrative embodiments, a filter media that is treated with simulant such that 10%-99% of the original void space remains within the media would improve filtration efficiency of that treated filter media 40. A preferred range of simulant treating would allow 1%-80% of the void space remains within the media prior to loading. Another preferred range of simulant treating would allow 70%-95% of the original void space to remain within the media prior to loading. Another preferred range of simulant treating would allow 40%-70% of the original void space to remain within the media prior to loading. Another preferred range of simulant treating would allow 40%-60% of the original void space to remain within the media prior to loading. Another preferred range of simulant treating would allow 10%-50% of the original void space to remain within the media prior to loading.

In certain illustrative embodiments, unconditioned filter media 10 or fresh filter media or new filter media may be used as long as it is treated with simulant such that 20%-95% of the original void space remains within the media prior to loading. A preferred range of simulant treating would allow 1%-80% of the initial void space within the media remains prior to loading. Another preferred range of simulant treating would allow 70%-95% of the original void space to remain within the media prior to loading. Another preferred range of simulant treating would allow 40%-70% of the original void space to remain within the media prior to loading. Another preferred range of simulant treating would allow 40%-60% of the original void space to remain within the media prior to loading. Another preferred range of simulant treating would allow 10%-50% of the original void space to remain within the media prior to loading.

In certain illustrative embodiments, clean filter media or previously used material where less than 1% of the original internal void is filled may be used as long as it is treated with simulant such that 10%-95% of the original void space remains within the media prior to loading. A preferred range of simulant treating would allow 1%-80% of the original void space remains within the media prior to loading. Another preferred range of simulant treating would allow 70%-95% of the original void space to remain within the media prior to loading. Another preferred range of simulant treating would allow 40%-70% of the original void space to remain within the media prior to loading. Another preferred range of simulant treating would allow 40%-60% of the original void space to remain within the media prior to loading. Another preferred range of simulant treating would allow 10%-50% of the original void space to remain within the media prior to loading.

In certain illustrative embodiments, previously used or recycled filter media may be utilized, as long as it is treated with retentate such that 10%-95% of the original void space within the media remains prior to loading. A preferred range of retentate treating would allow 1%-80% of the original void space remains within the media prior to loading. Another preferred range of retentate treating would allow 70%-95% of the original void space to remain within the media prior to loading. Another preferred range of retentate treating would allow 40%-70% of the original void space to remain within the media prior to loading. Another preferred range of retentate treating would allow 40%-60% of the original void space to remain within the media prior to loading. Another preferred range of retentate treating would allow 10%-50% of the original void space to remain within the media prior to loading.

In certain illustrative embodiments, filter media may be utilized, as long as it is treated with conditioner 50 such that 10%-95% of the original void space within the media remains prior to loading. A preferred range of conditioner 50 volume would allow 1%-80% of the original void space remains within the media prior to loading. Another preferred range of conditioner 50 volume would allow 70%-95% of the original void space to remain within the media prior to loading. Another preferred range of conditioner 50 volume would allow 40%-70% of the original void space to remain within the media prior to loading. Another preferred range of conditioner 50 volume would allow 40%-60% of the original void space to remain within the media prior to loading. Another preferred range of conditioner 50 volume would allow 10%-50% of the original void space to remain within the media prior to loading.

In certain illustrative embodiments, a method of filtration in a process vessel 60 is provided that includes: providing a filtration zone 65 in the process vessel 60, wherein the filtration zone 65 comprises a plurality of treated filter media 40; passing a fluid stream through the filtration zone 65; and removing one or more contaminants 45 from the fluid stream with the treated filter media 40, wherein each of the treated filter media 40 has an internal void space 30 formed therein, and wherein a conditioner 50 is embedded within the internal void space 30 prior to installing the treated filter media 40 into the process vessel 60 such that the internal void space 30 is filled with the conditioner 50 in the range from 1%-90% by volume. In certain illustrative embodiments, the conditioner 50 consists of one or more particles of iron sulfide, coke, bio-char, charcoal, carbon black, and phosphate salts, and the contaminants 45 also consist of one or more of iron sulfide, coke, bio-char, charcoal, carbon black, and phosphate salts.

In certain illustrative embodiments, the treated filter media 40 would be able to create agglomeration of contaminants 45 more quickly, which would increase desired filtration efficiency. The conditioner 50 would help capture contaminants 45 in the feed streams. This agglomeration would result in a much more rapid and efficient means of contaminant 45 accumulation which would enhance filtration. It could also increase the range of particle sizes that a piece or layer of treated filter media 40 is able to filter. For example, smaller contaminants 45 that may pass through larger media could be more easily captured as they would now agglomerate onto conditioner 50 instead of just passing through the filter media.

In certain illustrative embodiments, the treated filter media 40 would be able to use more internal capacity due to increased efficiency as well. Currently, many filter media can be only 20%-50% utilized as it takes time to accumulate and capture contaminants 45. Having treated filter media 40 with conditioner 50 would allow more efficient utilization of filter media, especially at start-of-run.

In certain illustrative embodiments, the treated filter media 40 can be used in various types of process vessels 60 in refining, petrochemical, and chemical plants to treat process streams. The treating process can include at least one of hydro-desulfurization, hydro-denitrogenation, hydrocracking, hydrogenation, hydro-dearomatization, hydro-deoxygenation, hydro-demetallization, isomerization, and other industrial processes. In certain illustrative embodiments, the treated filter media 40 can also be used in a guard vessel in front of these processes. In certain illustrative embodiments, the treated filter media 40 can also be used in feed filters both upstream and/or downstream of reactor vessels. The treated filter media 40 are particularly effective for use in applications processing feedstock derived from coker operations where the contaminant 45 load is relatively high and the particle size is highly variable since the treated filter media 40 provides a larger range of particle size capture. The treated filter media 40 are also particularly effective for use in applications where the feedstock is relatively corrosive [Total Acid Number (TAN)>1] because feedstock interaction with pipe metallurgy can be a large source of iron-sulfide based contaminant 45 that can be highly variable in particle size. The treated filter media 40 are also particularly effective for use in applications where the feedstock is relatively cool (<200° F.) and where small waxy solids may exist because these waxy solids can cause fouling in downstream vessels and treated filter media 40 will have improved efficiency in these types of applications.

In certain illustrative embodiments, the treated filter media 40 can be loaded into the process vessels 60 as zones or layers called filtration zones 65. The layers of treated filter media 40 would typically be loaded in a filtration zone 65 at the inlet of the process vessel 60; however, the filtration zone 65 could be loaded anywhere in the vessel 60 or could be loaded in the entirety of the vessel 60. There can be multiple filtration zones 65 within a vessel 60. The filtration zone 65 can contain layers of various treated filter media 40. Treated filter media 40 could be layered in multiple locations within a filtration zone 65, at the upstream portion of the filtration zone 65, at the downstream portion of the filtration zone 65 or in the middle or in between the two filtration zones 65. Or the treated filter media 40 could be commingled within the various layers or any other filtration media within the filtration zone 65. Treated filter media 40 could be combined with unconditioned filter media 10 to add functionality to a filtration process.

Treated filter media 40 could offer improved filtration efficiency at start of run. This improved efficiency at start of run allows the downstream processing material to be better protected throughout the cycle of the vessel. This improved efficiency protects the downstream processing bed 70 from developing a high resistance to flow. The improved efficiency protects the downstream processing bed 70 from contaminant 45 deposition in those layers. This deposition can lead to disruption in liquid distribution and cause under-utilization of the downstream process materials.

Moreover, in many existing units, ceramic or metallic filter media is used because it offers the highest potential cycle-average holding capacity available for contaminant 45 recovery and allows the largest potential volume for particle storage. However, while potential capacity can be maximized at the start of run with "clean" filter media, it may not offer the greatest trapping efficiency. Filtration efficiency is increased when there is contaminant 45 recovery inside the media through deposition within the treated filter media 40 or agglomeration with existing retentate. Since the start-of-run media is clean, it can take time for retentate to accumulate on and in the media. This inefficiency is particularly high during start-of-run of a vessel as it takes time to accumulate retentate.

Filtration initially occurs when contaminant 45 is trapped on the internal voids of the porous filter media and continues via agglomeration. Currently this could take several days/weeks or months to accomplish. This is a meaningful portion of a vessel's on-oil cycle. Even when a cycle is completed and the filter media is unloaded, filter media may not always be 100% full or can be far less than 100% full, which indicates that full efficiency may not have been reached even at the end of a cycle. The presently disclosed treated filter media 40 would address all these disadvantages.

In certain illustrative embodiments, a process vessel 60 is provided. The process vessel 60 can have a filtration zone 65 located therein, wherein the filtration zone 65 comprises a plurality of treated filter media 40. The process vessel 60 is configured such that a fluid stream can be passed through the filtration zone 65, and one or more contaminants 45 can be removed from the fluid stream with the treated filter media 40. Each of the treated filter media 40 can have an internal void space 30 formed therein, and a conditioner 50 can be embedded within the internal void space 30 prior to installing the treated filter media 40 into the process vessel 60 such that the internal void space 30 is filled with the conditioner 50 in the various ranges, by volume, otherwise set forth herein when the treated filter media 40 is first installed in the process vessel 60.

In certain illustrative embodiments, a fixed-bed feed filter or guard vessel can be positioned upstream of a trickle-bed process vessel 60. A large variety of treating processes exist in different types of vessels. Many of these are hydro-treaters. Examples of processes are hydro-desulfurization, hydro-denitrogenation, hydro-cracking, hydrogenation, hydro-dearomatization, hydro-deoxygenation, hydro-demetallization, isomerization, and other industrial processes. Unit types in refining and petrochemical applications can be naphtha hydro-treaters, pygas hydro-treaters, reformers, diesel hydro-treaters, gas oil hydro-treaters, cat feed hydro-treaters, FCC gasoline hydro-treaters, FCC hydrogenation units, renewable diesel hydro-treaters, fixed-bed transesterification vessels, hydro-cracker pre-treaters, hydro-crackers, isomerization units, kerosene hydro-treaters, jet hydro-treaters, lube oil hydro-treaters, de-waxing units, resid hydro-treaters, dryers, chloride treaters, clay treaters, salt dryers, and other fixed bed units. Process vessels 60 can also be present in water treatment facilities, waste facilities or the like to treat fluid process streams.

Fluid streams entering or within process vessels 60 can be organic or inorganic. Fluid streams can be liquid, gas or a combination. Common liquid fluid streams include vegetable oils, animal tallow, water, hydrocarbons, intermediates, crude oil and derivatives of crude oil such as naphtha, gasoline, kerosene, jet, diesel, gas oil, or other crude oil derivatives. Common gas fluid streams include methane, butane, propane, hydrogen, ammonia, hydrogen sulfide, hydrogen chloride, carbon dioxide, carbon monoxide, sulfur oxides, nitrogen oxides, water, oxygen, nitrogen, vaporized petroleum products such as naphtha or kerosene, or other gases. Gases can also be mixtures.

As used herein, the term "in the range from" and like terms is inclusive of the values at the high and low end of said ranges, as well as reasonable equivalents.

To the extent used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises iron sulfide.

2. The method of claim 1, wherein the contaminants comprise iron sulfide.

3. The method of claim 1, wherein the conditioner consists of iron sulfide.

4. The method of claim 2, wherein the contaminants consist of iron sulfide.

5. The method of claim 1, wherein the internal void space is filled with the conditioner in the range of 5%-80% by volume.

6. The method of claim 1, wherein the internal void space is filled with the conditioner in the range of 5%-30% by volume.

7. The method of claim 1, wherein the internal void space is filled with the conditioner in the range of 40%-60% by volume.

8. The method of claim 1, wherein the internal void space is filled with the conditioner in the range of 50%-90% by volume.

9. The method of claim 1, wherein the process vessel is a reactor.

10. The method of claim 1, wherein the process vessel is a guard vessel.

11. The method of claim 1, wherein the process vessel is a sorbent bed.

12. The method of claim 1, wherein the process vessel is a feed filter.

13. The method of claim 1, wherein the conditioner comprises pre-existing particles previously entrained in a filter media prior to use.

14. The method of claim 1, wherein the conditioner comprises particles added to a filter media prior to use that then become entrained prior to loading in the process vessel.

15. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises iron sulfide.

16. The method of claim 15, wherein the contaminants comprise iron sulfide.

17. The method of claim 15, wherein the conditioner consists of iron sulfide.

18. The method of claim 16, wherein the contaminants consist of one or more particles of iron sulfide.

19. The method of claim 15, wherein the internal void space has 20%-95% by volume of the original void space remaining.

20. The method of claim 15, wherein the internal void space has 70%-95% by volume of the original void space remaining.

21. The method of claim 15, wherein the internal void space has 40%-60% by volume of the original void space remaining.

22. The method of claim 15, wherein the internal void space has 10%-50% by volume of the original void space remaining.

23. The method of claim 15, wherein the process vessel is a reactor.

24. The method of claim 15, wherein the process vessel is a guard vessel.

25. The method of claim 15, wherein the process vessel is a sorbent bed.

26. The method of claim 15, wherein the process vessel is a feed filter.

27. The method of claim 15, wherein the conditioner comprises pre-existing particles previously entrained in a filter media prior to use.

28. The method of claim 15, wherein the conditioner comprises particles added to a filter media prior to use that then become entrained prior to loading in the process vessel.

29. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises the same material as the contaminants.

30. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises the same material as the contaminants.

31. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises coke.

32. The method of claim 31, wherein the contaminants comprise coke.

33. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises bio-char wherein the contaminants comprises bio-char.

34. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises charcoal.

35. The method of claim 31, wherein the contaminants comprise charcoal.

36. A method of filtration in a process vessel comprising:

providing a filtration zone in the process vessel, wherein the filtration zone comprises a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the vessel such that the internal void space is filled with the conditioner in the range from 1%-90% by volume, and wherein the conditioner comprises carbon black wherein the contaminants comprises carbon black.

37. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises coke.

38. The method of claim 37, wherein the contaminants comprise coke.

39. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises bio-char wherein the contaminants comprises bio-char.

40. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises charcoal.

41. The method of claim 40, wherein the contaminants comprise charcoal.

42. A method of filtration in a process vessel comprising:

providing a filtration zone in the process vessel, wherein the filtration zone contains a plurality of treated filter media;

passing a fluid stream through the filtration zone; and removing one or more contaminants from the fluid stream with the treated filter media, wherein each of the treated filter media has an internal void space formed therein, and wherein a conditioner is embedded within the internal void space prior to installing the treated filter media into the process vessel such that the internal void space has 10%-99% by volume of the original void space remaining, and wherein the conditioner comprises carbon black wherein the contaminants comprises carbon black.

* * * * *